US012641695B2

(12) United States Patent
Chen

(10) Patent No.: US 12,641,695 B2
(45) Date of Patent: May 26, 2026

(54) CASCADE LED DRIVING DATA TRANSMISSION METHOD AND LED DRIVING CIRCUIT

(71) Applicant: SHENZHEN SUNMOON MICROELECTRONICS CO., LTD., Shenzhen (CN)

(72) Inventor: Keyong Chen, Shenzhen (CN)

(73) Assignee: SHENZHEN SUNMOON MICROELECTRONICS CO., LTD., Shenzhen (CN)

( * ) Notice: Subject to any disclaimer, the term of this patent is extended or adjusted under 35 U.S.C. 154(b) by 62 days.

(21) Appl. No.: 18/806,671

(22) Filed: Aug. 15, 2024

(65) Prior Publication Data

US 2025/0098050 A1 Mar. 20, 2025

(30) Foreign Application Priority Data

Sep. 18, 2023 (CN) ......................... 202311200889.3

(51) Int. Cl.
*H05B 45/30* (2020.01)
*H05B 45/345* (2020.01)
*H05B 47/18* (2020.01)

(52) U.S. Cl.
CPC ........... *H05B 45/345* (2020.01); *H05B 47/18* (2020.01)

(58) Field of Classification Search
CPC ...... H05B 45/10; H05B 45/30; H05B 45/345; H05B 47/10; H05B 47/18
See application file for complete search history.

(56) References Cited

U.S. PATENT DOCUMENTS

2012/0081015 A1* 4/2012 Shimomura ......... H05B 45/395 315/188
2024/0428722 A1* 12/2024 Yeh .......................... G09G 3/32

* cited by examiner

*Primary Examiner* — Jimmy T Vu

(57) ABSTRACT

A cascade LED driving data transmission method is provided, comprising: determining validity of a first input data from the first input port and a second input data from the second input port, wherein when the second input data is valid, it is selected as an input data, and when the second input data is invalid and the first input data is valid, the first input data is selected as the input data; sampling control data and extracting driving data from the input data and shaping the remaining data and outputting it as an output data to the output port; and driving a corresponding LED using the control data and the driving data. The method uses a signal for transmitting data from an additional chip as a main input, effectively solving the problem of losing data in a frame when there is no signal and achieving real-time detection and switching.

8 Claims, 3 Drawing Sheets

CASCADE LED DRIVING DATA TRANSMISSION METHOD AND LED DRIVING CIRCUIT

CROSS REFERENCE TO RELATED APPLICATIONS

The present application claims the benefit of Chinese Patent Application No. 202311200889.3 filed on Sep. 18, 2023, the contents of which are incorporated herein by reference in their entirety.

FIELD

The present application relates to LED (light-emitting diode) driving technologies, and in particular, to a cascade LED driving data transmission method and an LED driving circuit.

BACKGROUND

In recent years, with the rapid development of LED landscape lighting technology, LED lights have been widely used in urban building and bridge landscape decoration, advertising promotion, stage background, and other fields due to their advantages of low power consumption, energy savings, and low-carbon, high efficiency and durability, and rich colors.

A single-input cascade LED driver chip is a chip that controls multiple LED lights through a single input signal. When using a single-input cascade LED driver chip, multiple LED lights can be connected in a cascaded manner to share the same control signal; thereby, a driving circuit of the LED lights can be simplified, and system complexity and cost can be reduced. However, due to the cascaded connection between LED driver chips, the input signal of each LED driver chip comes from the output signal of a previous stage LED driver chip. Once an abnormality occurs in a certain LED driver chip, it can cause the display of the LED lights driven by that chip to be abnormal, and even the output signal transmitted to the next stage LED driver chip to be abnormal, ultimately leading to abnormal display of the LED lights carried by all LED driver chips cascaded after that chip. Existing multi-input cascade schemes can solve the above problems, but they cannot achieve real-time switching when there is no signal in a certain frame and an input path needs to be judged in that frame, resulting in data loss in that frame. Based on this, a new solution is needed.

SUMMARY

A technical problem to be solved by the present application is to provide a cascade LED driving data transmission method to solve the problem of losing data in a frame when there is no signal and to achieve real-time detection and real-time switching.

According to an aspect of the present application, a cascade LED driving data transmission method is provided, used for a LED driving circuit comprising n cascaded LED driver chips, wherein n is a positive integer greater than or equal to 2, each LED driver chip comprises a first input port, a second input port, and an output port, and one or both of the first input port and the second input port of a first LED driver chip are input with input signals, the first input port of an i-th LED driver chip is connected to the output port of an i-1th LED driver chip, and the second input port of the i-th LED driver chip is connected to the output port of an i-2th LED driver chip, wherein i is a positive integer greater than or equal to 2 and less than or equal to n, and for the i-th LED driver chip, said method comprises the following steps: determining validity of a first input data from the first input port and a second input data from the second input port, wherein when the second input data is valid, the second input data is selected as an input data for the i-th LED driver chip, and when the second input data is invalid and the first input data is valid, the first input data is selected as the input data for the i-th LED driver chip; sampling control data and extracting driving data for the i-th LED driver chip from the input data, and shaping the remaining data and outputting a shaped remanning data as an output data of the i-th LED driver chip to the output port of the i-th LED driver chip; and driving an i-th LED using the control data and the driving data for the i-th LED driver chip.

According to the other aspect of the present application, a LED driving circuit is provided, comprising n cascaded LED driver chips, wherein n is a positive integer greater than or equal to 2, each LED driver chip comprises a first input port, a second input port, and an output port, and one or both of the first input port and the second input port of a first LED driver chip are input with input signals, the first input port of an i-th LED driver chip is connected to the output port of an i-1th LED driver chip, and the second input port of the i-th LED driver chip is connected to the output port of an i-2th LED driver chip, wherein i is a positive integer greater than or equal to 2 and less than or equal to n, and each LED driver chip comprises: an input detecting module configured to determine validity of a first input data from the first input port and a second input data from the second input port, wherein when the second input data is valid, the second input data is selected as an input data, and when the second input data is invalid and the first input data is valid, the first input data is selected as the input data; a decoding module configured to sample control data and extract driving data for the LED driver chip from the input data; a shaping and regeneration module configured to shape the remaining data from the decoding module and use a shaped remanning data as an output data of the LED driver chip; and a driving module configured to drive a corresponding LED using the control data and the driving data.

The cascade LED driving data transmission method and the LED driving circuit, according to embodiments of the present application, have the following beneficial effects: The cascade LED driving data transmission method according to the present application uses multiple signal inputs to ensure that display and signal transmission can be normal in the event that a single chip experiences a breakpoint, thereby improving signal transmission stability. Meanwhile, the signal of transmitting one more chip of data is used as the main input, which can well solve the problem of losing the data of a frame when there is no signal and realize real-time detection and real-time switching.

BRIEF DESCRIPTION OF THE DRAWINGS

In order to more clearly explain embodiments of the present application or technical solutions in the prior art, drawings used in the description of the embodiments or the prior art will be briefly introduced below. Obviously, the drawings in the following description are merely some embodiments of the present application. For those of ordinary skill in the art, other drawings can be obtained based on these drawings without creative efforts.

DETAILED DESCRIPTION

Figure 1:
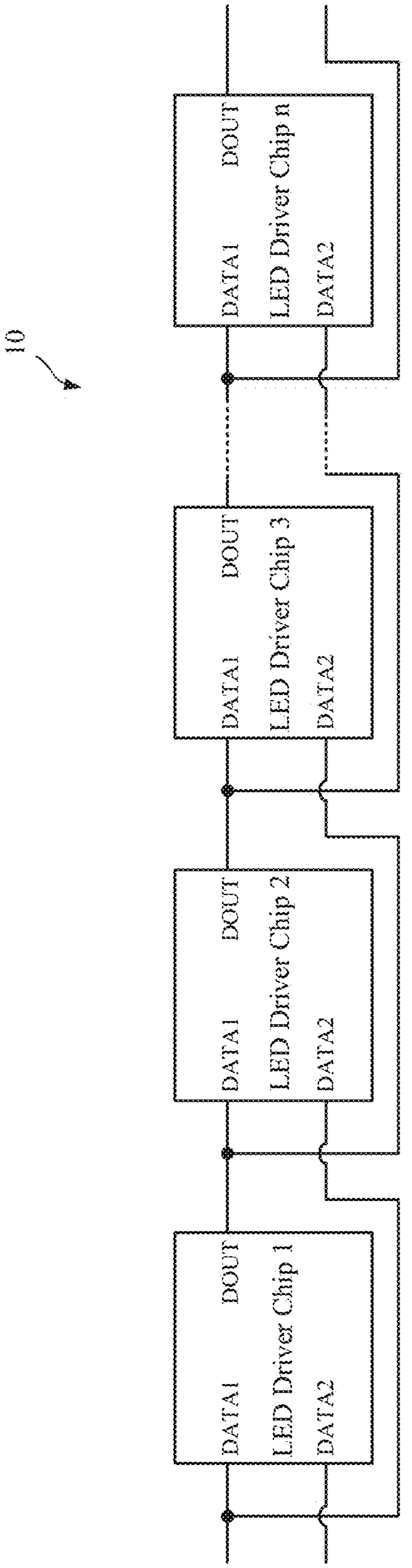
FIG. 1 shows a circuit diagram of an LED driving circuit according to an embodiment of the present application.

In order to facilitate understanding of the present application, the present application will be described more fully hereinafter with reference to the related drawings. Typical embodiments of the application are shown in the drawings. However, the present application may be embodied in many different forms and is not limited to the embodiments described herein. Rather, these embodiments are provided so that the disclosure to the present application will be thorough and complete.

Unless otherwise defined, all technical and scientific terms used herein have the same meaning as commonly understood by one of ordinary skill in the art to which this application belongs. The terms used herein in the description of the present application are for the purpose of describing specific embodiments only and are not intended to limit the present application.

The overall idea of the present application is to provide a cascade LED driving data transmission method that addresses the problem in the prior art, where damage in one single-input cascade LED chip causes abnormalities of all subsequent chips, and multi-input cascade chips are unable to achieve real-time switching. The cascade LED driving data transmission method according to the present application uses multiple signal inputs to ensure that display and signal transmission can be normal in the event that a single chip experiences a breakpoint, thereby improving signal transmission stability. Meanwhile, the signal of transmitting one more chip of data is used as the main input, which can well solve the problem of losing the data of a frame when there is no signal and realize real-time detection and real-time switching.

In order to better understand the above technical solution, the following will provide a detailed explanation of the above technical solution in conjunction with the accompanying drawings and specific implementation methods of the specification. It should be understood that the embodiments of the present application and the specific features in the embodiments are detailed explanations of the technical solution of the present application, rather than limitations on the technical solution of the present application. In the absence of conflicts, the embodiments of the present application and the technical features in the embodiments can be combined with each other.

FIG. 1 shows a circuit diagram of a LED driving circuit 10 according to an embodiment of the present application. As shown in FIG. 1, the LED driving circuit 10 comprises n cascaded LED driver chips, wherein n is a positive integer greater than or equal to 2. To distinguish them, multiple LED driver chips are sequentially numbered as LED driver chip 1, LED driver chip 2, LED driver chip 3 . . . and LED driver n. Function and pin structure of each LED driver chip are the same, and one of the LED driver chips will be specifically described below. Each LED driver chip comprises a first input port DATA1, a second input port DATA2, and an output port DOUT. The first input port DATA1 of an i-th LED driver chip is connected to the output port DOUT of an i-1th LED driver chip, and the second input port DATA2 of the i-th LED driver chip is connected to the output port DOUT of an i-2th LED driver chip, wherein i is a positive integer greater than or equal to 2 and less than or equal to n. In the case of limited controller output port resources, it is possible for only one of the first input port DATA1 and the second input port DATA2 of the first LED driver chip 1 to be connected to the controller, but this may result in abnormal signal transmission of the first LED driver chip, leading to LED lights in the entire cascade being abnormal.

Figure 2:
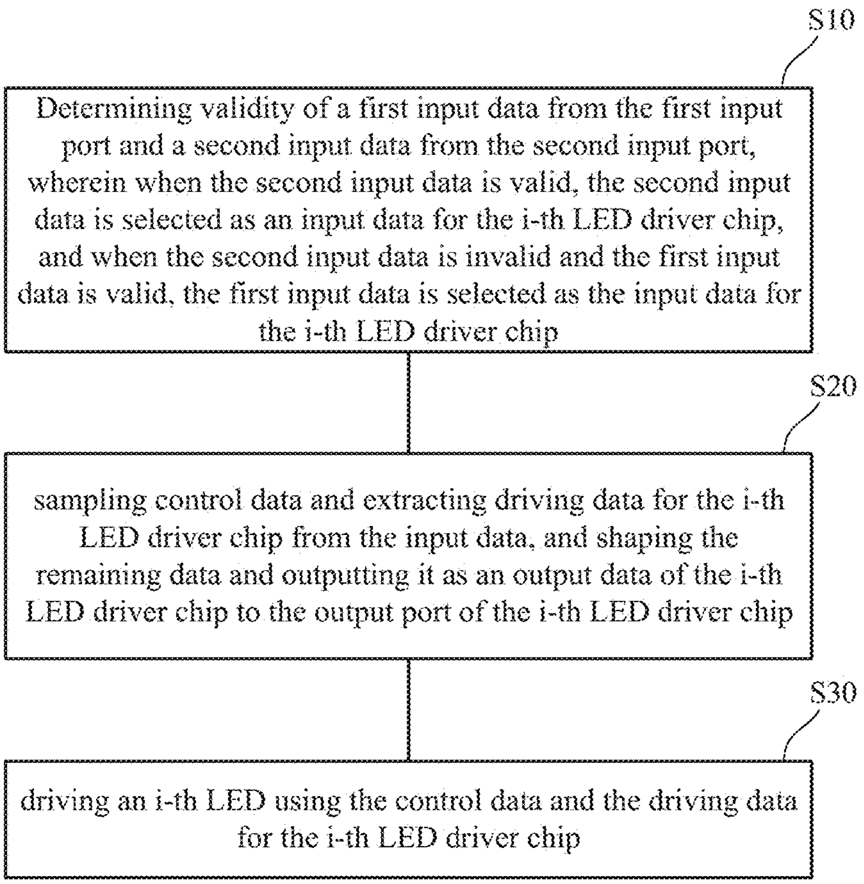
FIG. 2 shows a flowchart of a cascade LED driving data transmission method according to an embodiment of the present application.

FIG. 2 shows a flowchart of a cascade LED driving data transmission method according to an embodiment of the present application. As shown in FIG. 2, the cascade LED driving data transmission method according to the present application comprises the following steps:

Step S10: Validity of a first input data from the first input port and a second input data from the second input port is determined, wherein when the second input data is valid, the second input data is selected as an input data for the i-th LED driver chip, and when the second input data is invalid and the first input data is valid, the first input data is selected as the input data for the i-th LED driver chip.

Specifically, in one embodiment of the present application, for any LED driver chip in the LED driving circuit, it receives output data from a previous LED driving chip and output data from a further previous LED driving chip through two data input ports, respectively. That is, the second input data from the second input port contains one more LED driver chip's data than the first input data from the first input port. In this way, when an abnormality occurs in the previous LED driver chip, the data required by the current LED driver chip can still be obtained from the output data of the further previous driver chip through the second input port, to ensure that display and signal transmission can be normal when a single chip experiences a breakpoint, and to improve signal transmission stability. For example, as shown in FIG. 3, using 8-bit grayscale data and RGB three channel driving data (including but not limited to grayscale data, expandable register data) and control data (including but not limited to current gain data) of 15 bits for explanation, it is obvious that each LED driver chip needs to capture 24 bits of data, so DATA2 has an additional 24 bits of data more than DATA1.

Specifically, in the embodiment of the present application, in normal mode, after receiving the first input data and the second input data, it is necessary to perform validity judgment to determine which input data to be selected for decoding. In the present application, it is preferred to decode the second input data, that is, to prioritize decoding the second input data when it is valid, and only when there is a problem with the transmission path of the second input data (such as a short circuit or an open circuit occurs) will the first input data be used for decoding. This ensures real-time switching even when there is no signal in a frame through real-time detection, avoiding frame data loss.

Figure 3:
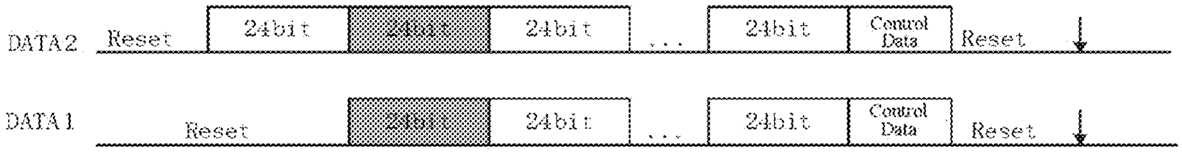
FIG. 3 shows a schematic diagram of input signals of a LED driver according to an embodiment of the present application.

Furthermore, in the embodiment of the present application, as shown in FIG. 3, since the second input data contains one more LED driver chip's data than the first input data, assuming that each LED driver chip requires x bits of driving data, the second input data contains x more bits than the first input data (e.g., 24 bits as shown in FIG. 3). Under normal circumstances, when there is data in first y (y is less than or equal to x) bits of the second input data, there is no data in the first input port. If there is data in the first input port at this time, it means that there is a short circuit between the first input port and the second input port, and the first input data is the same as the second input data. If there is no data in the first y (y is less than or equal to x) bits of the second input data, it means that an open circuit occurs in the second input port, and the first input data is valid at this time. There is also a situation where both the first input port and the second input port are open circuited and there is no input signal, which is not within the scope of the present application. Therefore, step S10 further comprises:

Detecting whether there is data in the first y bits of the second input data, wherein each LED driver chip requires x bits of driving data, and y is a positive integer less than x;

Detecting whether there is data input to the first input port when there is data in the first y bits of the second input data, and if there is data input to the first input port at this time, selecting the first input data as the input data for the i-th LED driver chip; if there is no data input to the first input port at this time, selecting the second input data as the input data for the i-th LED driver chip; and Detecting whether there is data input to the first input port when there is no data in the first y bits of the second input data, and if there is data input to the first input port at this time, selecting the first input data as the input data for the i-th LED driver chip.

Furthermore, in one embodiment of the present application, a counter can be set to detect whether there is data in the first y bits of the second input data; that is, the counter starts counting when data is received in the second input port, and the counting increases by 1 for every 1 bit of data received.

Step S20: Control data is sampled, driving data for the i-th LED driver chip is extracted from the input data, and the remaining data is shaped and output as the output data of the i-th LED driver chip to its output port.

Specifically, in one embodiment of the present application, after the input data is selected, the input data is sent to a decoding module to extract the driving data required for display for the current LED driver chip and to obtain current gain data in the control data for changing the current magnitude to change the display brightness. At the same time, the remaining data is shaped and regenerated before being output to the next LED driver chip. Shaping the data transmitted to the next LED driver chip can optimize signal quality, reduce signal attenuation in the cascade system, improve data transmission accuracy, and avoid decoding errors and abnormal displays caused by signal attenuation when there are too many cascaded chips.

Furthermore, in one embodiment of the present application, when the input data is the first input data, first x bits of the first input data are extracted and decoded as the driving data, and when the input data is the second input data, first 2x bits of the second input data are extracted and x+1th to 2xth bits therein are decoded as the driving data. For example, as shown in FIG. 3, when DATA1 is used as the input data, the first 24 bits of data are sampled and extracted (gray area in FIG. 3), and when DATA2 is used as the input data, the first 48 bits of data are extracted, but only the 25-48 bits of data therein are sampled (gray area in FIG. 3).

Step S30: The control data and the driving data for the i-th LED driver chip are used to drive an i-th LED.

Specifically, in one embodiment of the present application, the actual display effect is determined based on the driving data and the current gain data in the control data; that is, grayscale is displayed based on the decoded driving data, and the current magnitude is changed based on the current gain data in the control data to change the display brightness.

Furthermore, in one embodiment of the present application, there is also a breakpoint detection mode, which can be performed before the LED driving circuit 10 starts working. A detection signal is input to the first LED driver chip to perform breakpoint detection on the LED driving circuit 10. During breakpoint detection, if there is a short circuit or open circuit, a specific gray level (such as a red light) will be displayed. Engineers can repair or replace the LED driving chip to ensure a normal connection before actual use. For the i-th LED driver chip, the breakpoint detection specifically comprises:

Turning on counting when any one of the first input port and the second input port starts receiving data, and the counting being increased by 1 for every 1-bit data received;

Stop counting when a first count value of the first input port reaches j or a second count value of the second input port reaches k, wherein j is a positive integer less than x and k is a positive integer less than 2 times x; and Determining whether a breakpoint has occurred based on the first count value and the second count value, wherein if the second count value is 0, it is determined that an open circuit has occurred in the second input port; if the first count value is 0, it is determined that an open circuit has occurred in the first input port; and if the second count value is equal to the first count value, it is determined that a short circuit has occurred between the first input port and the second input port.

Figure 4:
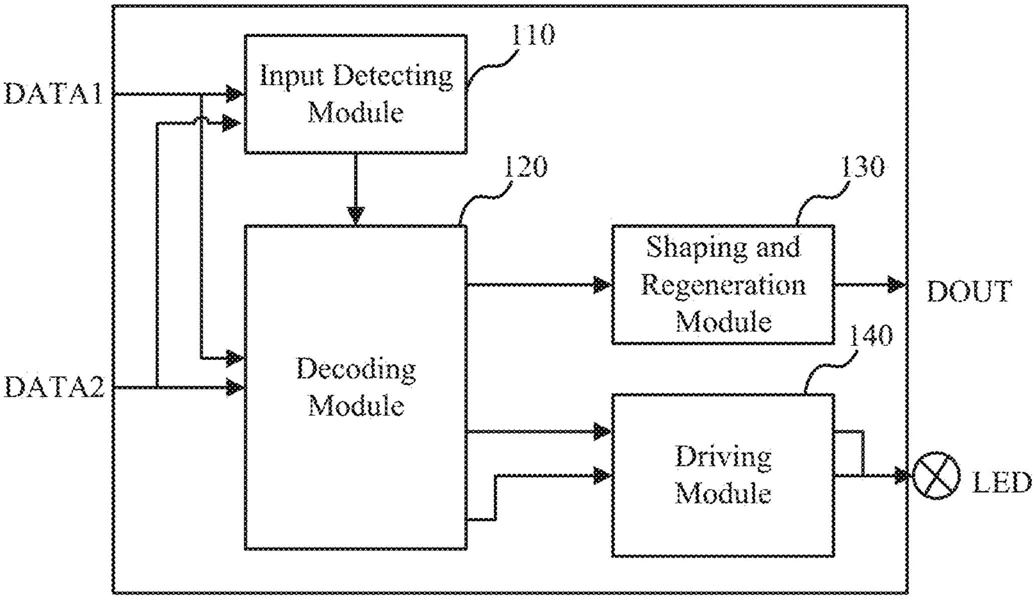
FIG. 4 shows an internal circuit diagram of any LED driver in the LED driving circuit shown in FIG. 1.

FIG. 4 shows an internal circuit diagram of any one of the LED driver chips 1~n in the LED driving circuit 10 shown in FIG. 1. As shown in FIG. 4, each LED driver chip comprises an input detecting module 110, a decoding module 120, a shaping and regeneration module 130, and a driving module 140.

Specifically, in one embodiment of the present application, the input detecting module 110 is configured to determine the validity of the first input data from the first input port and the second input data from the second input port. When the second input data is valid, the second input data is selected as the input data. When the second input data is invalid and the first input data is valid, the first input data is selected as the input data. Further, the validity detection specifically comprises: whether there is data in the first y bits of the second input data, wherein each LED driver chip requires x bits of driving data, and y is a positive integer less than x; detecting whether there is data input to the first input port when there is data in the first y bits of the second input data, and if there is data input to the first input port at this time, selecting the first input data as the input data for the i-th LED driver chip, if there is no data input to the first input port at this time, selecting the second input data as the input data for the i-th LED driver chip; and detecting whether there is data input to the first input port when there is no data in the first y bits of the second input data, and if there is data input to the first input port at this time, selecting the first input data as the input data for the i-th LED driver chip.

Specifically, in one embodiment of the present application, the decoding module 120 is configured to sample the control data (including but not limited to current gain data) and extract the driving data for the i-th LED driver chip from the input data. When the input data is the first input data, the decoding module 120 extracts the first x bits of the first input data and decodes them as the driving data. When the input data is the second input data, the decoding module 120 extracts the first 2x bits of the second input data and decodes the x+1th to 2xth bits therein as the driving data.

Specifically, in an embodiment of the present application, the shaping and regeneration module 130 is configured to shape the remaining data from the decoding module and use shaped data as the output data of the current LED driver chip. The driving module 140 is configured to drive a corresponding LED using the control data (including but not limited to current gain data) and the driving data.

Furthermore, in an embodiment of the present application, the input detecting module 110 is further configured to input a detection signal to the first LED driving chip to perform breakpoint detection on the LED driving circuit. The breakpoint detection comprises: turning on counting when any one of the first input port and the second input port starts receiving data, and the counting being increased by 1 for every 1-bit data received; stop counting when a first count value of the first input port reaches j or a second count value of the second input port reaches k, wherein j is a positive integer less than x and k is a positive integer less than 2×; and determining whether a breakpoint has occurred based on the first count value and the second count value, wherein if the second count value is 0, it is determined that an open circuit has occurred in the second input port, if the first count value is 0, it is determined that an open circuit has occurred in the first input port, and if the second count value is equal to the first count value, it is determined that a short circuit has occurred between the first input port and the second input port.

The embodiments of the present application have been described above in conjunction with the accompanying drawings, but the present application is not limited to the above-mentioned specific embodiments, which are merely illustrative rather than restrictive. Under the inspiration of the present application, those of ordinary skill in the art can also make many forms without departing from the spirit of the present application and the scope protected by the claims, which all belong to the protection scope of the present application.

The invention claimed is:

1. A cascade LED driving data transmission method, used for a LED driving circuit comprising n cascaded LED driver chips, wherein n is a positive integer greater than or equal to 2, each LED driver chip comprises a first input port, a second input port, and an output port, and one or both of the first input port and the second input port of a first LED driver chip are input with input signals, the first input port of an i-th LED driver chip is connected to the output port of an i-1th LED driver chip, and the second input port of the i-th LED driver chip is connected to the output port of an i-2th LED driver chip, wherein i is a positive integer greater than or equal to 2 and less than or equal to n, characterized in that for the i-th LED driver chip, said method comprises the following steps:

determining validity of a first input data from the first input port and a second input data from the second input port, wherein when the second input data is valid, the second input data is selected as an input data for the i-th LED driver chip, and when the second input data is invalid and the first input data is valid, the first input data is selected as the input data for the i-th LED driver chip;

sampling control data and extracting driving data for the i-th LED driver chip from the input data, and shaping the remaining data and outputting a shaped remanning data as an output data of the i-th LED driver chip to the output port of the i-th LED driver chip; and driving an i-th LED using the control data and the driving data for the i-th LED driver chip.

2. The cascade LED driving data transmission method according to claim 1, wherein said determining validity of a first input data from the first input port and a second input data from the second input port comprises:

detecting whether there is data in the first y bits of the second input data, wherein each LED driver chip requires x bits of driving data, and y is a positive integer less than x;

detecting whether there is data input to the first input port when there is data in the first y bits of the second input data, and if there is data input to the first input port at this time, selecting the first input data as the input data for the i-th LED driver chip, if there is no data input to the first input port at this time, selecting the second input data as the input data for the i-th LED driver chip; and detecting whether there is data input to the first input port when there is no data in the first y bits of the second input data, and if there is data input to the first input port at this time, selecting the first input data as the input data for the i-th LED driver chip.

3. The cascade LED driving data transmission method according to claim 2, wherein when the input data is the first input data, first x bits of the first input data are extracted and decoded as the driving data, and when the input data is the second input data, first 2x bits of the second input data are extracted and x+1th to 2xth bits therein are decoded as the driving data.

4. The cascade LED driving data transmission method according to claim 2, further comprising inputting a detection signal to the first LED driver chip to perform breakpoint detection on the LED driving circuit, wherein for the i-th LED driver chip, said breakpoint detection comprises the following steps:

turning on counting when any one of the first input port and the second input port starts receiving data, and the counting being increased by 1 for every 1-bit data received;

stop counting when a first count value of the first input port reaches j or a second count value of the second input port reaches k, wherein j is a positive integer less than x and k is a positive integer less than 2 times x; and determining whether a breakpoint has occurred based on the first count value and the second count value, wherein, if the second count value is 0, it is determined that an open circuit has occurred in the second input port, if the first count value is 0, it is determined that an open circuit has occurred in the first input port, and if the second count value is equal to the first count value, it is determined that a short circuit has occurred between the first input port and the second input port.

5. A LED driving circuit, comprising n cascaded LED driver chips, wherein n is a positive integer greater than or equal to 2, each LED driver chip comprises a first input port, a second input port, and an output port, and one or both of the first input port and the second input port of a first LED driver chip are input with input signals, the first input port of an i-th LED driver chip is connected to the output port of an i-1th LED driver chip, and the second input port of the i-th LED driver chip is connected to the output port of an i-2th LED driver chip, wherein i is a positive integer greater than or equal to 2 and less than or equal to n, characterized in that each LED driver chip comprises:

an input detecting module being configured to determine validity of a first input data from the first input port and a second input data from the second input port, wherein when the second input data is valid, the second input data is selected as an input data, and when the second input data is invalid and the first input data is valid, the first input data is selected as the input data;

a decoding module being configured to sample control data and extract driving data for the LED driver chip from the input data;

a shaping and regeneration module being configured to shape the remaining data from the decoding module and use a shaped remanning data as an output data of the LED driver chip; and a driving module being configured to drive a corresponding LED using the control data and the driving data.

6. The LED driving circuit according to claim 5, wherein the input detecting module is configured for:

detecting whether there is data in the first y bits of the second input data, wherein each LED driver chip requires x bits of driving data, and y is a positive integer less than x;

detecting whether there is data input to the first input port when there is data in the first y bits of the second input data, and if there is data input to the first input port at this time, selecting the first input data as the input data for the LED driver chip, if there is no data input to the first input port at this time, selecting the second input data as the input data for the LED driver chip; and detecting whether there is data input to the first input port when there is no data in the first y bits of the second input data, and if there is data input to the first input port at this time, selecting the first input data as the input data for the LED driver chip.

7. The LED driving circuit according to claim 6, wherein when the input data is the first input data, the decoding module extracts first x bits of the first input data and decodes them as the driving data, and when the input data is the second input data, the decoding module extracts first 2x bits of the second input data and decodes x+1th to 2xth bits therein as the driving data.

8. The LED driving circuit according to claim 6, wherein the input detecting module is further configured to input a detection signal to the first LED driving chip to perform breakpoint detection on the LED driving circuit, wherein the breakpoint detection comprises:

turning on counting when any one of the first input port and the second input port starts receiving data, and the counting being increased by 1 for every 1-bit data received;

stop counting when a first count value of the first input port reaches j or a second count value of the second input port reaches k, wherein j is a positive integer less than x and k is a positive integer less than 2 times x; and determining whether a breakpoint has occurred based on the first count value and the second count value, wherein if the second count value is 0, it is determined that an open circuit has occurred in the second input port, if the first count value is 0, it is determined that an open circuit has occurred in the first input port, and if the second count value is equal to the first count value, it is determined that a short circuit has occurred between the first input port and the second input port.

* * * * *